United States Patent [19]

Denz et al.

[11] Patent Number: 4,685,435
[45] Date of Patent: Aug. 11, 1987

[54] SAFETY DEVICE FOR A SUPERCHARGED INTERNAL COMBUSTION ENGINE

[75] Inventors: Helmut Denz, Stuttgart; Hans-Peter Stumm, Hemmingen, both of Fed. Rep. of Germany

[73] Assignee: Robert Bosch GmbH, Stuttgart, Fed. Rep. of Germany

[21] Appl. No.: 282,339

[22] Filed: Jul. 10, 1981

[30] Foreign Application Priority Data

Jul. 10, 1980 [DE] Fed. Rep. of Germany ....... 3026150

[51] Int. Cl.⁴ .................... F02M 51/00; F02D 33/00; F02P 5/04
[52] U.S. Cl. .............. 123/478; 123/198 DB; 123/415; 60/601; 60/603; 60/611
[58] Field of Search ........ 123/478, 415, 416, 198 DB, 123/198 D; 60/601, 603, 605, 611

[56] References Cited

U.S. PATENT DOCUMENTS 4,044,560  8/1977  Dorsch et al. .................. 60/601
4,112,879  9/1978  Assenheimer et al. ............ 123/478
4,256,072  3/1981  Nakatomi et al. ................ 123/415

FOREIGN PATENT DOCUMENTS 781382  11/1980  U.S.S.R. ............................ 60/603

Primary Examiner—Willis R. Wolfe, Jr.
Attorney, Agent, or Firm—Edwin E. Greigg

[57] ABSTRACT

A safety device is proposed for an internal combustion engine which is operated with supercharging in combination with both a fuel metering system and a control unit for the instant of ignition. The safety device is characterized in that it controls the fuel metering in accordane with the volumetric efficiency of the engine. In the case of an excessively high volumetric efficiency, a defect of the charger or of the charge-pressure regulator is presumed. In order to protect the engine from mechanical and thermal overload, the fuel metering in this case is either reduced or shut off completely. The subsequent reinitiation of the fuel metering is suitably effected in combination with a late instant of ignition or a late injection onset in order to prevent a jump in torque.

5 Claims, 4 Drawing Figures

SAFETY DEVICE FOR A SUPERCHARGED INTERNAL COMBUSTION ENGINE

BACKGROUND OF THE INVENTION

In internal combustion engines with supercharging, care must be taken than a certain maximum charge pressure not be exceeded; otherwise the engine is endangered both thermally and mechanically. For regulating turbochargers and the engines associated with them, a method and an apparatus are known which make use of a bypass valve often in the form of a charge-pressure regulator for bypassing the exhaust gas turbine; the bypass valve is controlled in accordance with the air pressure in the charge-pressure tube. In this case, a pressure meter on the charge-air side of the compressor acts as a control variable for the charge-pressure regulator. If there is a failure of this charge-pressure regulator, which may be caused by a mechanical defect such as seizing of the bypass valve, then the output limitation for the turbocharger is also absent; the result is that the charge pressure in the intake conduit increases, which accordingly increases both the quantity of the air throughput and the volumetric efficiency. This term is defined as follows from Bosch Dictionary, Vol 2, page 360, "volumetric efficiency is equal to the actual volume of fresh air-fuel charge ratio (or in case of fuel-injection engines, fresh air charge ratio) drawn in at normal atmospheric pressure during each working cycle of the engine, divided by the theoretically possible volume of charge. This ratio is always less than 1." As long as the air flow rate meter is still operating below its maximum signal, then a fuel injection system, for instance, will supply the corresponding supplementary fuel quantity, causing yet a further increase in the volumetric efficiency.

This excessive charge can cause the destruction of an engine within only a few seconds, especially since the malfunctioning status cannot necessarily be recognized by the driver and prevented by closing the throttle valve.

Since present-day turbochargers furnish the maximum permissible charge pressure at approximately half the maximum rpm of the engine, the engine rpm is conventional systems is limited in the case of malfunction to the charge-onset rpm with the aid of an excess-charge-pressure switch. However, as an extra component, the required pressure switch is also a further possible source of malfunctions. This is especially true since a pressure which would cause this switch to respond does not arise during normal operation, and so the switch has to be a product having an extremely long life and extremely good reliability.

OBJECT AND SUMMARY OF THE INVENTION

The safety device according to the invention has the advantage over the prior art that extra components are not required, and thus there are no additional problems with reliability. Furthermore, in the case of excessive charging, making an intervention into fuel metering in accordance with the volumetric efficiency of the engine has proved to be extremely suitable in terms of overall output and driving operation.

Advantageous modifications of and improvements to the safety device of the invention are attained by application of the characteristics of the invention in which it is particularly advantageous, when the excessive-charge condition is ending and normal fuel metering is being reinitiated, to prevent an abrupt jump in torque by adjusting the ignition timing, at least at first, toward "late".

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
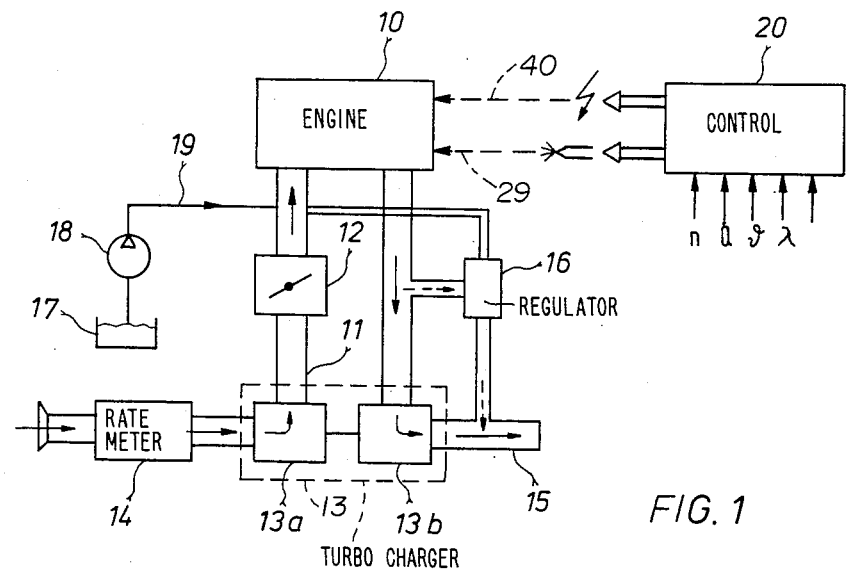
FIG. 1 shows a fundamental disposition of an internal combustion engine operated with supercharging, in combination with a fuel metering system and a control unit for the instant of ignition according to a preferred embodiment and best mode of the invention.

FIG. 1 is a fundamental overview of an internal combustion engine operated with supercharging, in combination with an electronic control device for fuel injection and ignition. The engine itself is indicated by reference numeral 10, having the charge air tube 11 with the throttle valve 12. The two portions of a turbocharger 13 are indicated by 13a and 13b. The charging device (compressor) 13a is located ahead of the throttle valve 12 and following an air flow rate meter 14, while the exhaust gas turbine 13b is located in the exhaust line 15. The exhaust gas turbine 13b can be controlled by means of a charge-pressure regulator 16 functioning in the manner of a bypass regulator.

The fuel supply means to the engine is only roughly indicated by a series circuit of fuel tank 17, fuel pump 18 and fuel line 19 leading to an intake tube after the throttle valve 12. An electronic control device 20 receives input variables such as rpm, air throughput in the intake tube, temperature and possible exhaust gas composition; on its output side, it emits both an ignition signal and an injection signal.

Figure 2:
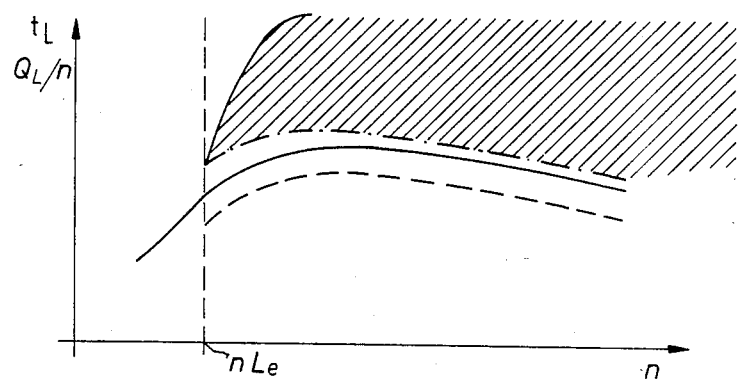
FIG. 2 is a diagram showing the volumetric efficiency plotted over the rpm.

FIG. 2 indicates the volumetric efficiency of the engine, plotted over the rpm. The term "volumetric efficiency" is intended to mean the quantity of air aspirated per stroke; it is obtained from the quotients of the air flow rate signal and the rpm signal. As may be seen in FIG. 2, there is a curve which at first rises, with higher rpm, and then gradually flattens out. The shaded area indicates an excessive charge range which follows at a certain safety interval above the curve. While the maximum volumetric efficiency curve occurring during stationary operation is indicated by a solid line, a so-called reinitiation threshold (indicated by broken lines as shown) takes its course just below the solid line.

Figure 3:
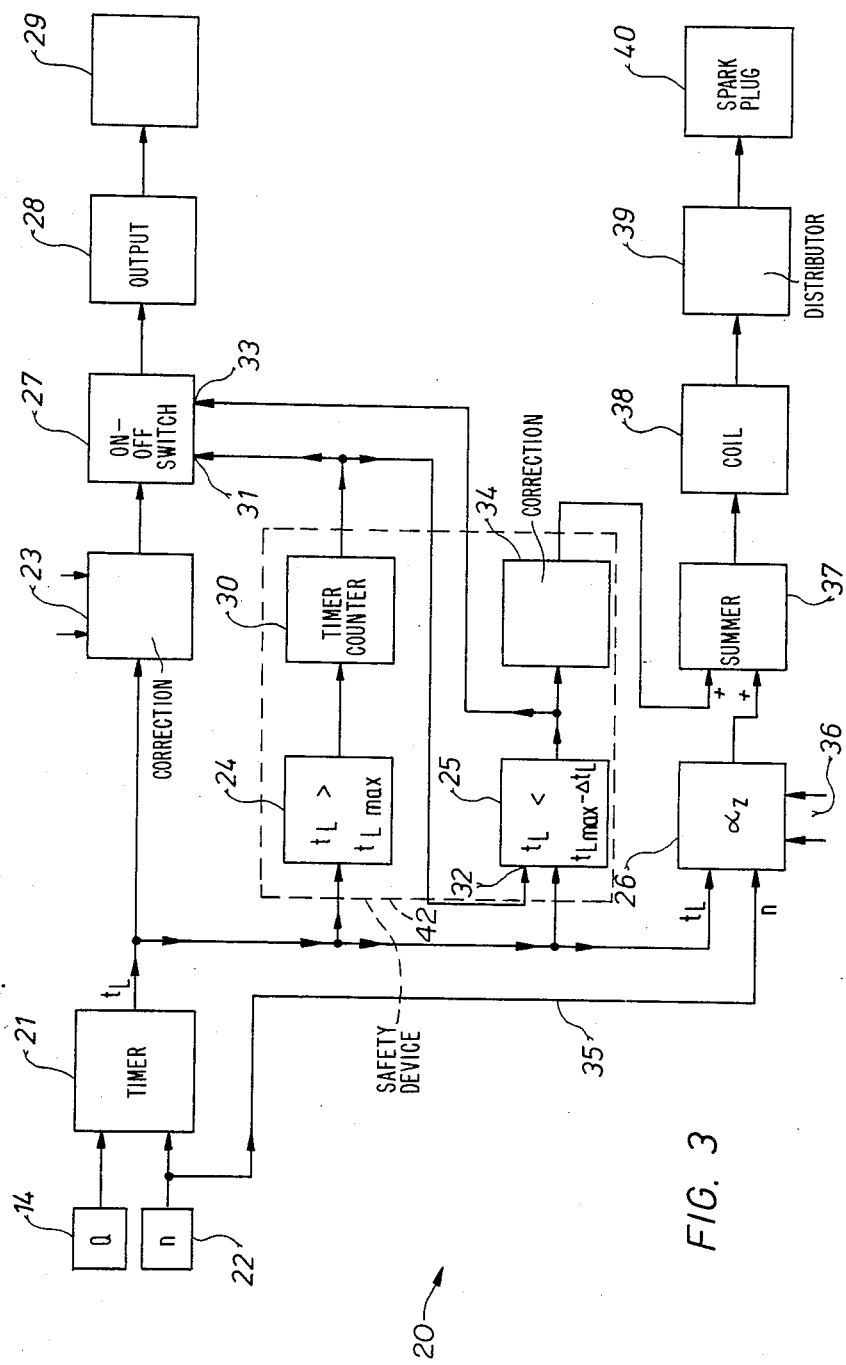
FIG. 3 is a block circuit diagram of one possible realization of a fuel injection control system having a safety device incorporated therein.

FIG. 3 is a block circuit diagram for a safety device 42 according to the invention, in combination with a fuel injection system 21, 23, 27, 28, 29 and a control device or unit 22, 26, 37, 38, 39, 40 for the instant of ignition. A timing element 21 is connected both to the air throughput meter 14 and an rpm meter 22. On the output side, the timing element 21 is coupled with a correction circuit 23, two comparators 24 and 25, and an injection performance graph 26. The correction circuit 23 adjoins an ON-OFF switch 27 followed by the output stage 28 and one or more injection valves 29. A line leads from the comparator 24 to a timing element 30 (realized, by way of example, by means of a counter), whose output is conected in turn with a shutoff input 31 of the switch 27 and with a control input 32 of the second comparator 25. Its output is coupled both with a switch-on input 33 of the switch 27 and with the input of an ignition-angle correction circuit 34. The ignition-angle performance graph 26 contains not only a signal from the timing element 21 but also an rpm signal via a line 35, as well as correction factors via correction inputs 36 as needed. A subsequent ignition-angle summer 37 adds up the output signals of the ignition-angle correction circuit 34 and the performance graph 26 and directs corresponding output signals to spark plugs 40 via an ignition coil 38 and a high-voltage distributor 39.

The two primary lines of the subject of FIG. 3, which pertain to ignition and injection, are already sufficiently well known per se. The elementts which diverge from the prior art are the safety device 42 including the two comparators 24 and 32, the timing circuit 30 and the ignition-angle correction circuit 34.

In accordance with the basic concept of the invention, the fuel metering is to be cut off when there is an excessively high load signal; then, after the load signal has dropped to a permissible level, the ignition angle is to be brought back to its normal position from a value adjusted toward "late" in order to prevent a jump in torque. The first comparator 24 ascertains whether the load signal has exceeded a given maximum value. During dynamic operation (such as acceleration or changing gears) it is possible for a higher-than-permissible load signal to appear briefly; for this reason, an excessively high load signal is recognized as a malfunction only after a predetermined period of time has elapsed. This is the purpose of the timing element 30 disposed subsequent to the comparator 24. The timing element 30 emits an output signal only if the preceding comparator 24 signals an excessive load signal for longer than a predetermined period of time; in this case, it may be concluded that there is a defect in connection with the turbocharger 13. If this output signal appears at the timing element 30, then in the example of FIG. 3 the switch 27 shuts OFF the injection signals for the injection valves; thus there is automatically a reduction in torque and an attendant reduction in the charge pressure.

The reinitiation threshold in FIG. 2, which pertains to the return to operation of the fuel metering, is realized in the subject of FIG. 3 by means of the comparator 25. This comparator 25 is switched ON with the output signal of the timing element 30; it then directs its output to high potential whenever the load signal from the timing element 21 has attained a certain value below the maximum threshold. This signals then turns the switch 27 back ON and switches the ignition-angle correction circuit 34 back ON as well. With a view to preventing a jump in torque when the fuel metering is put back into operation, the ignition angle is retracted, either at or even before the renewed onset of fuel metering; after fuel metering has begun again the ignition angle is then adjusted back to the normal value, that is, back toward "early". The particular function according to which the normal ignition setting is attained must be adaped to the specialized engine type in question, and it can therefore not be specified here.

Figure 4:
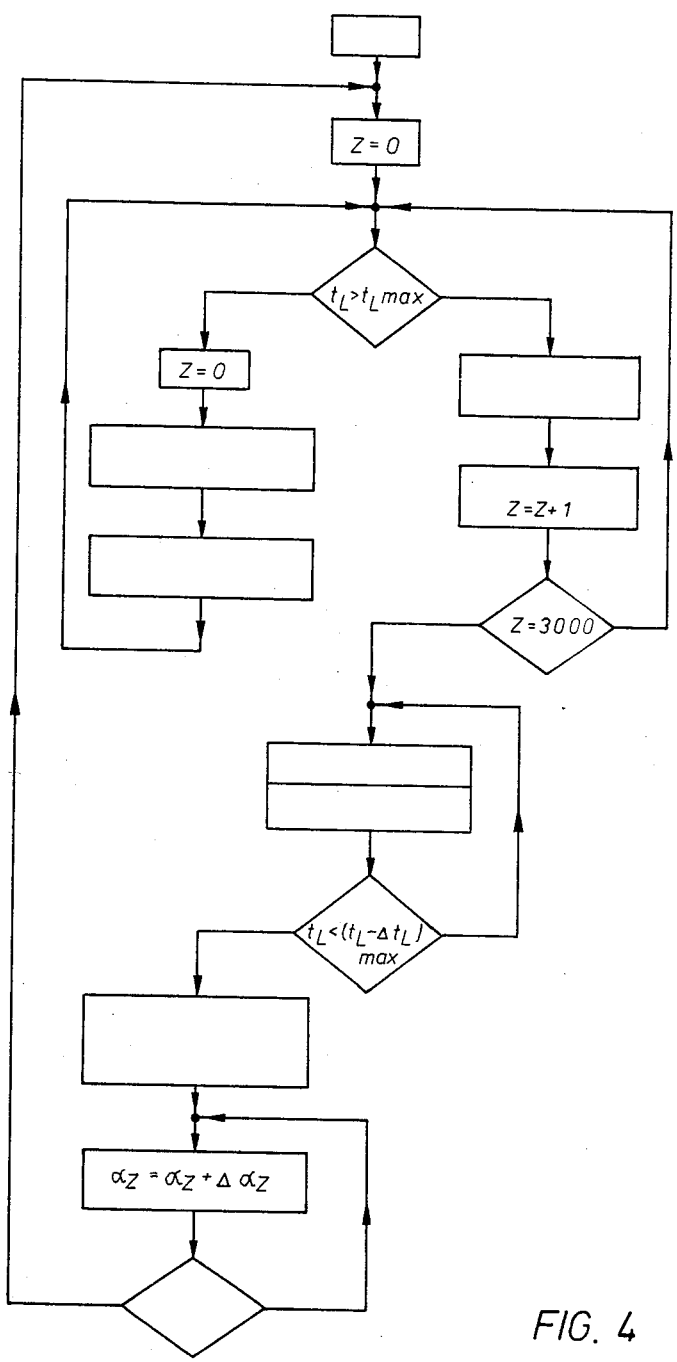
FIG. 4 is a program flow diagram of a best mode of operation of the layout of FIG. 3, and embodying a plan showing a course of programmed control.

While FIG. 3 is a block-type illustration of a safety device 42 in combination with both a fuel injection system 21, 23, 27, 28, 29 and a control unit 22, 36, 37, 38, 39 40 for the instant of ignition, the safety device 42 is also realizable in principle with computer control techniques. In this case, the flow diagram shown in FIG. 4 must be converted to an appropriate program, and the program must be incorporated in the generalized signal processing of the computer for injection and ignition. The timing element 30 corresponds to the cycle-counting device, and the total number of increases in value is oriented to a monitoring duration of approximately 3 seconds.

The primary advantage of the device described above is that defects in the charger 13 are recognized, and that there is an automatic reaction to these malfunctions. If a defect at the charge-pressure regulator, for instance, proves to be merely temporary, then the load signal also resumes normal values. The injection and ignition now function once again accordance with the values characteristic of normal operation. If the defect at the charge-pressure regulator is stationary, however, then the signal does again attain correspondingly high values, and the process for reducing or shutting OFF fuel metering begins once again as described above.

No matter what type of defect exists, the internal combustion engine can continue to be driven, although with reduced power; still, there is now no longer any danger of the engine being destroyed. The safety device 42 described is realizable in principle in all engines driven with supercharging, whatever the manner of fuel metering or the engine type being used. What is essential is only that when there is an unusually high volumetric efficiency of the individual cylinders, the fuel supply is at least throttled. In a suitable fashion, the standard applied here for volumetric efficiency is the quantity of air aspirated during one stroke.

When the fuel supply is reinitiated, the instant of ignition in Otto engines is retarded, in order to prevent a jump in torque. In a Diesel engine, the same effect is attained by retarding the onset of injection.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A safety device for an internal combustion engine operated with a supercharger comprising:
   means supplying an air-flow rate signal;
   means supplying an rpm signal;
   the quotient of said air-flow rate signal and said rpm signal defining the volumetric efficiency of said engine;
   a fuel metering system;
   a control unit for the timing of ignition;
   a safety device for monitoring a threshold value of said volumetric efficiency connected between said fuel metering system and said control unit, said device having means for reducing the quantity of metered fuel to said fuel metering system in accordance with said value of volumetric efficiency, said safety device comprising a first comparison means responsive to a timing element coupled to said air flow rate signal means and to said rpm signal means and producing an output, a timing means responsive to the output of said first comparison means and producing an output to decontrol said fuel metering system, a second comparison means responsive to the output of said timing means and responsive to said timing element and producing an output coupled to control said fuel metering system, and an ignition-angle correction means responsive to said output of said second comparison means and producing an output coupled to said control unit for determining the instant of ignition.

2. A safety device as defined by claim 1, wherein the fuel metering is cut OFF by the safety device whenever, for a predetermined number of metering procedures and for a predetermined period of time, a maximum value for the volumetric efficiency is exceeded.

3. A safety device as defined by claim 1, wherein what is ascertained as the volumetric efficiency is the quantity of air aspirated per stroke.

4. A safety device as defined by claim 1, wherein subsequent to a cutoff by the safety device, the fuel metering is reinitiated whenever the volumetric efficiency has fallen below a selectable value.

5. A safety device as defined by claim 4, wherein upon the reinitiation of the fuel metering by the safety device, the instant of ignition is adjusted from a late timing value back to its normal status.

* * * * *